United States Patent
Tai

(10) Patent No.: US 6,266,852 B1
(45) Date of Patent: Jul. 31, 2001

(54) BIND RING DEVICE

(76) Inventor: Chin-Lien Tai, No.2 Lane 272 Pun Diing Road, Hsinchu City (TW)

( * ) Notice: Subject to any disclaimer, the term of this patent is extended or adjusted under 35 U.S.C. 154(b) by 0 days.

(21) Appl. No.: 09/495,871

(22) Filed: Feb. 2, 2000

(51) Int. Cl.⁷ .............................. B65D 63/00; B65D 67/02
(52) U.S. Cl. ..................... 24/16 PB; 24/16 R; 24/17 AP; 24/20 TT; 24/487
(58) Field of Search ................................ 24/17 AP, 16 R, 24/20 TT, 487, 16 PB; 248/74.1, 60, 74.2, 62, 74.3; 223/103; 292/307 R, 311, 315, 325; 606/213, 215–221

(56) References Cited

U.S. PATENT DOCUMENTS

| | | | |
|---|---|---|---|
| 3,913,187 | * 10/1975 | Okuda | 24/285 |
| 3,979,093 | * 9/1976 | Madden | 248/56 |
| 4,183,120 | * 1/1980 | Thorne | 24/16 R |
| 4,483,556 | * 11/1984 | LiVolsi | 285/252 |
| 4,631,782 | * 12/1986 | Gecs | 24/16 PB |
| 5,806,819 | * 9/1998 | Martone | 248/230.1 |
| 5,937,488 | * 8/1999 | Geiger | 24/339 |
| 6,126,119 | * 10/2000 | Giangrasso | 248/58 |
| 6,164,605 | * 12/2000 | Drake et al. | 248/74.3 |

* cited by examiner

Primary Examiner—James R. Brittain
Assistant Examiner—Ruth C Rodriguez
(74) Attorney, Agent, or Firm—Bacon & Thomas, PLLC

(57) ABSTRACT

A bind ring is a ring shaped body with a zigzag lock end and a zigzag receiving end. The bind ring further comprises an inclining arc part, two arc parts, and two circular recesses. The zigzag lock end further has a zigzag part, and the zigzag receiving end has a curved engaging channel with a zigzag surface. Two guide blocks are disposed at the both ends on the channel respectively to assist the lock end engaging with the receiving end. The zigzag lock end is adjustably engaging with the zigzag receiving end by way of the zigzag surface and the zigzag part meshing each other to tie up a bundle of electric wires or cables.

2 Claims, 5 Drawing Sheets

BIND RING DEVICE

BACKGROUND OF THE INVENTION

1. Field of the Invention

The present invention relates to a bind ring device, and particularly to a bind ring device for a bundle of electric wires on a decorative light assembly used during Christmas holidays. The bind ring device has two detachably engaging ends for tying a bundle of electric wires or cables firmly to ease treatment of the electric wires.

2. Description of Related Art

A prior art metal band, as shown in FIG. 1, is usually adopted to tie a bundle of electric wires on a decorative light assembly for Christmas holidays. But, it is disadvantageous for the metal band to package and arrange the bundle of electric wires and the shortcomings are listed hereinafter:

(1) It is not possible to package the bundle of electric wires quickly because it is required to twist the band several turns in order to tie it up.

(2) It is hard to control the tightness by way of twisting the metal band.

(3) It is not possible to pass the safety codes in countries having higher regulation standard. Therefore, business changes for selling the decorative light assembly are limited.

SUMMARY OF THE INVENTION

An object of the present invention resides in that a bind ring for a bundle of electric wires has a zigzag receiving end and a zigzag lock end to engage with each other such that the bundle of electric wires can be bound firmly and advantageously packed or arranged handily.

BRIEF DESCRIPTION OF THE DRAWINGS

The present invention can be more fully understood by referring to the following description and accompanying drawings, in which.

DETAILED DESCRIPTION OF THE PREFERRED EMBODIMENT

Figure 1:
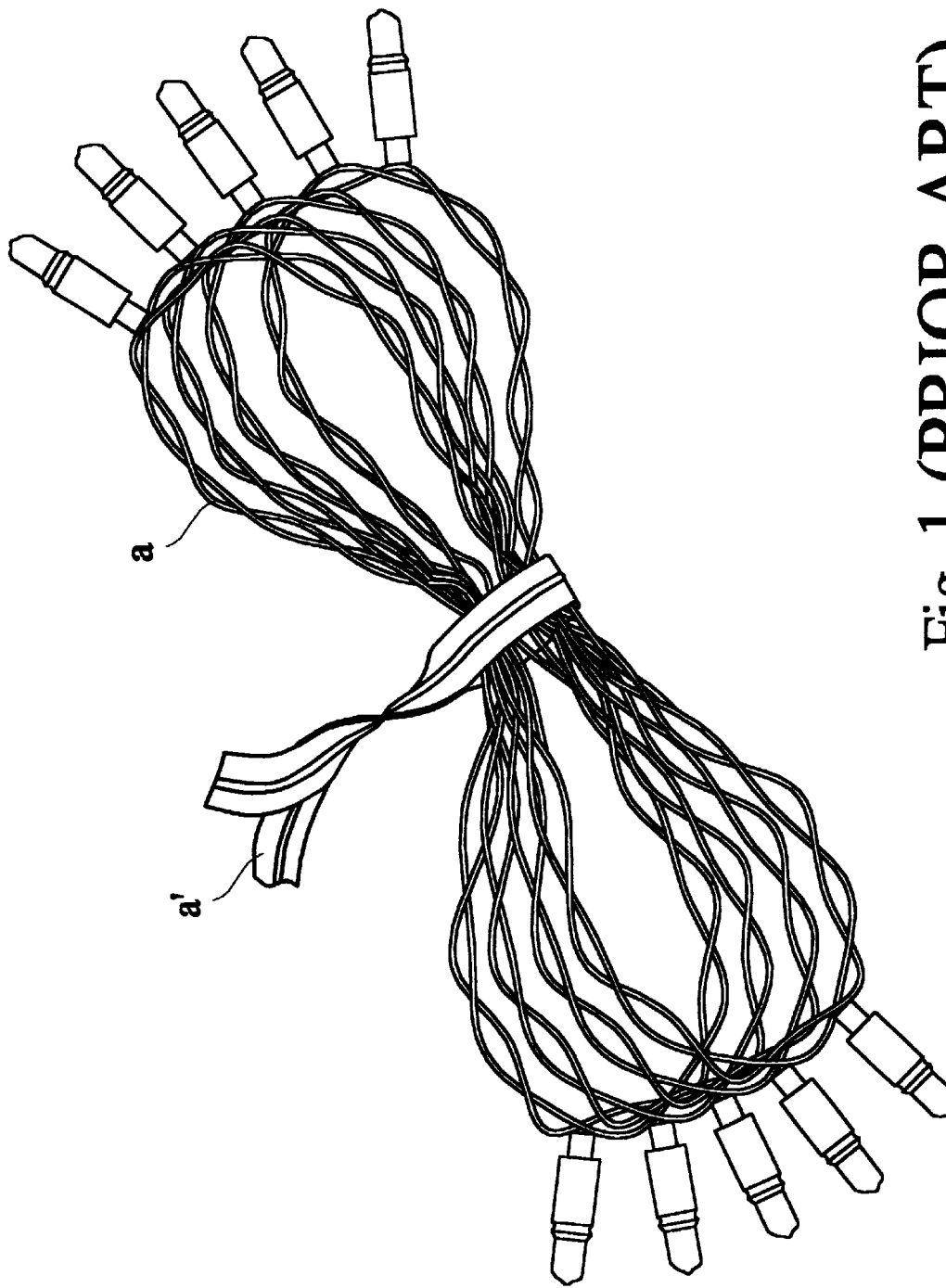
FIG. 1 is a perspective view of a prior art binder showing a bundle of electric wires on a decorative light assembly being bound.
Figure 2:
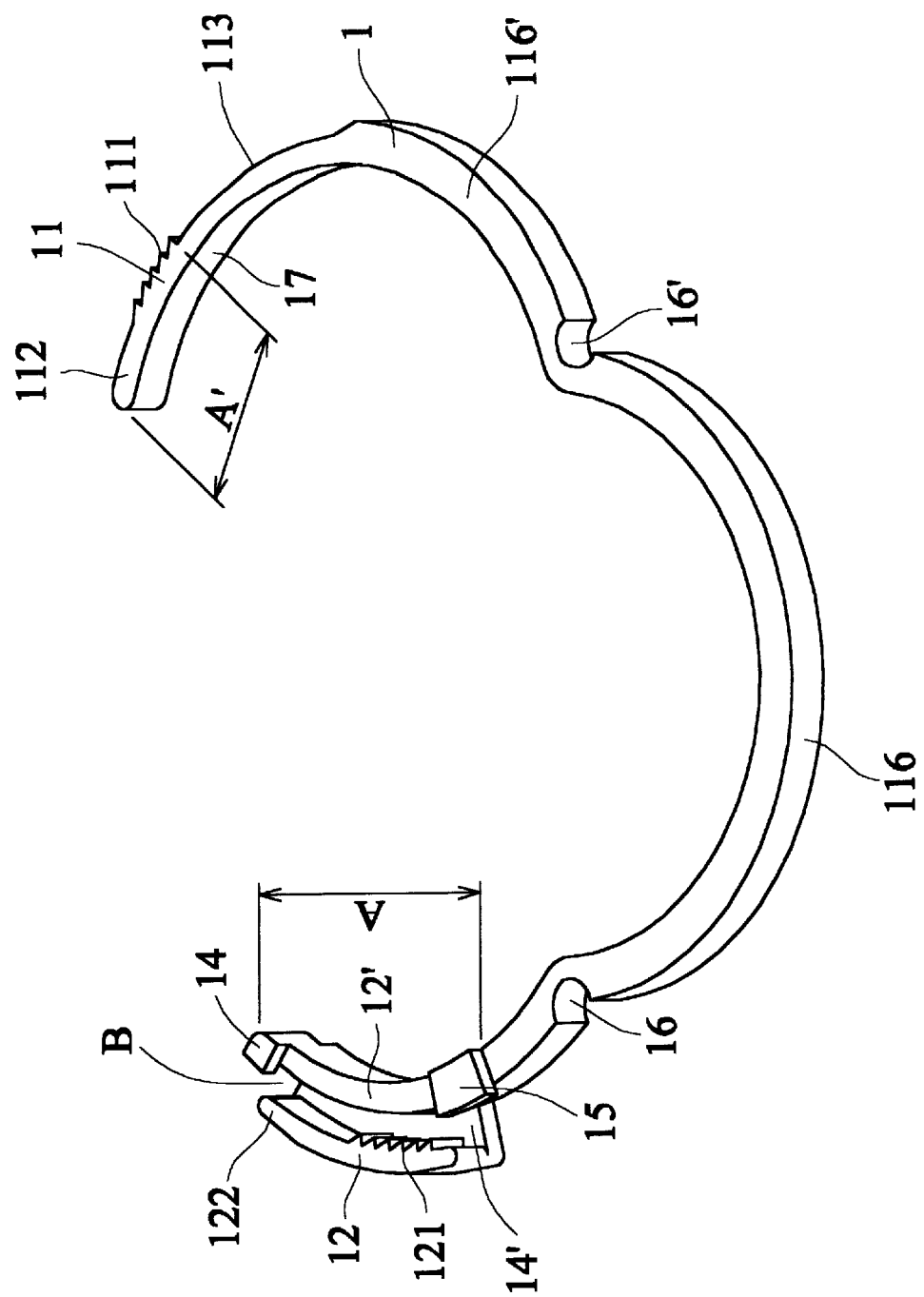
FIG. 2 is a perspective view of bind ring in accordance with the present invention showing both ends in a state of opening.
Figure 3:
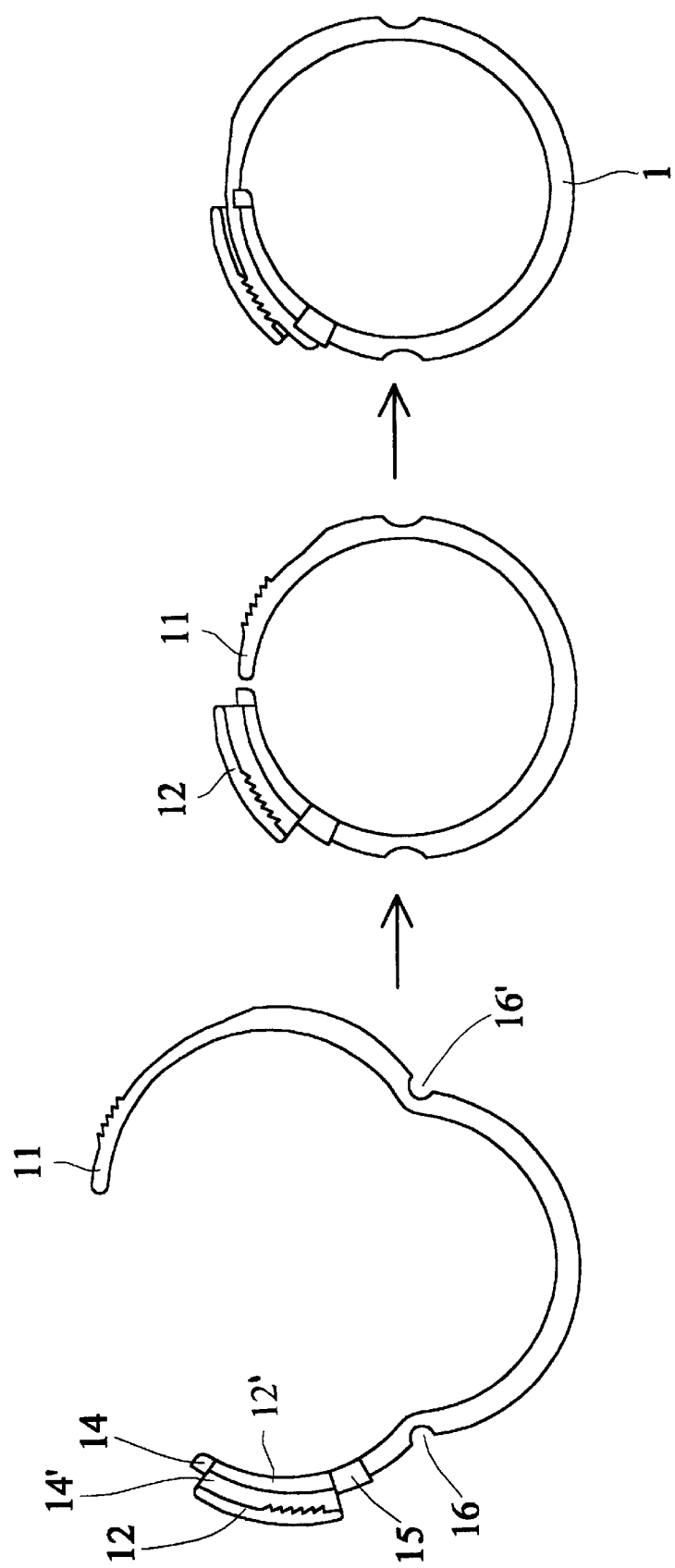
FIG. 3 is a plan view of the bind ring shown in FIG. 2 illustrating both ends of the bind ring in the process of engaging with each other.
Figure 4:
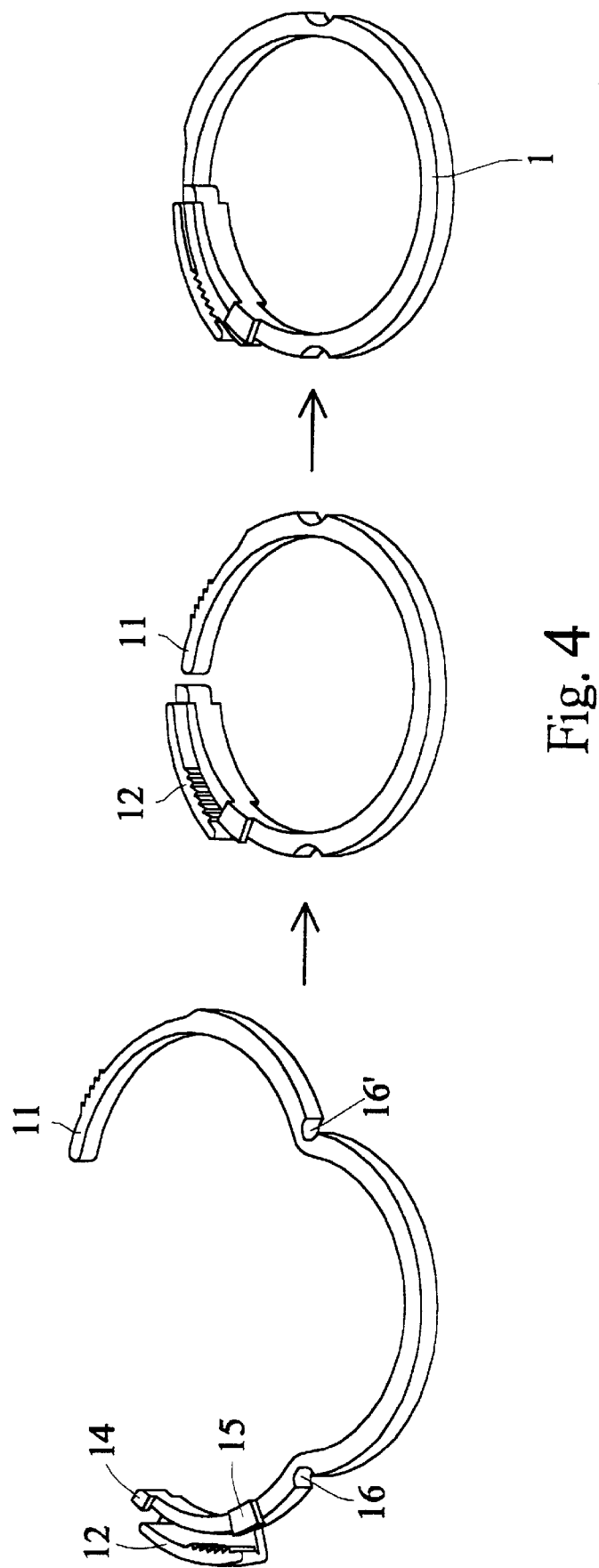
FIG. 4 is a perspective view of FIG. 3.
Figure 5:
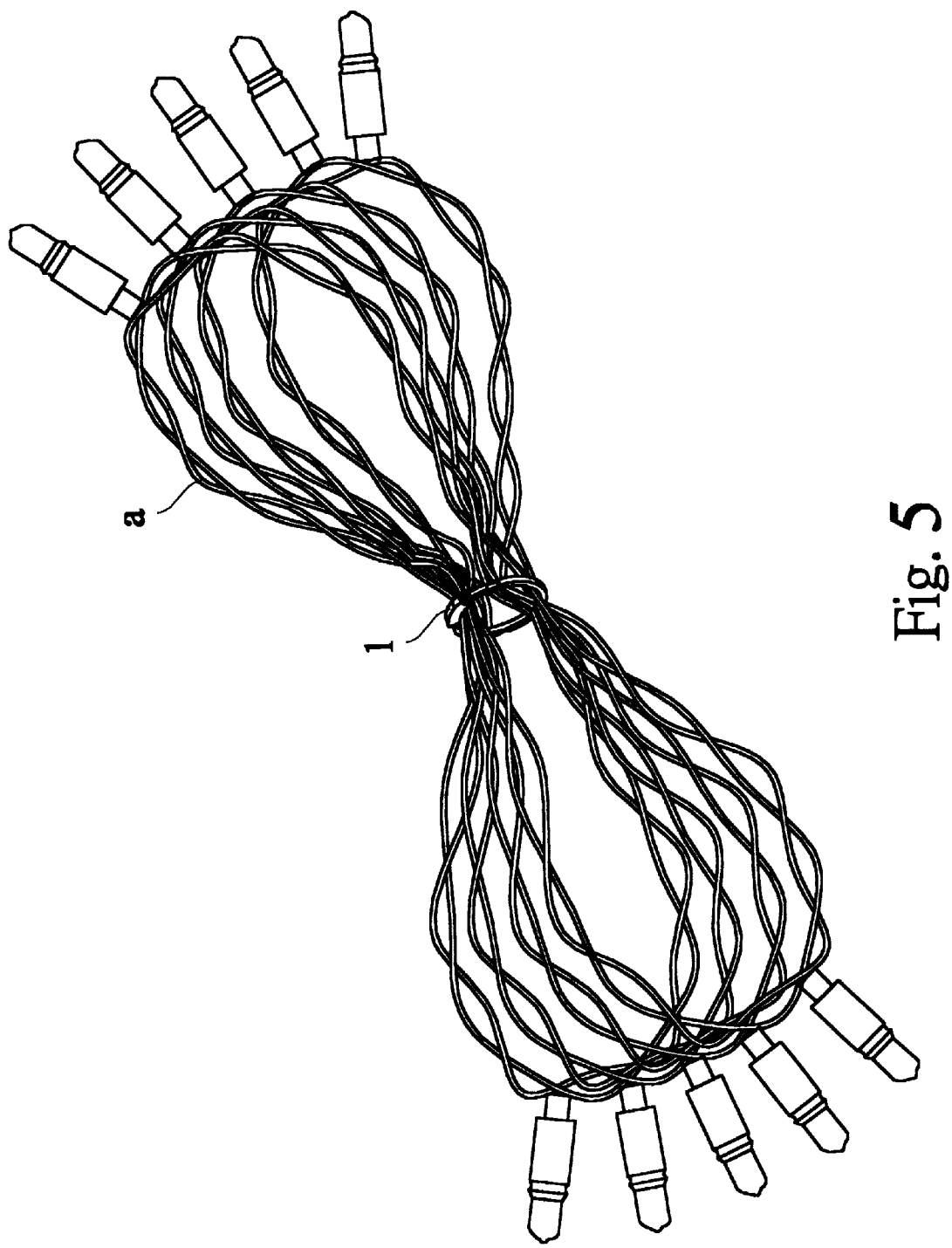
FIG. 5 is a perspective view of the bind ring tying a bundle of electric wires on a decorative light assembly.

Referring to FIGS. 2, 3, 4, and 5, a bind ring for electric wires on a decorative light assembly in accordance to present invention basically is ring shaped body 1. The ring shaped body 1 comprises a zigzag lock end 11, a zigzag receiving end, a first guide block 14, a second guide block 15', an inner annular surface 17, and two circular recesses 16, 16' as shown in FIG. 2. The zigzag lock end 11 has a zigzag part 111 and a lock end part 112. An inclined part 113 extends away from the zigzag lock end 11 and a first arc part 116' adjoins the inclined part 113. A second arc part 116 has an end thereof adjoining the first arc part 116', and a circular recess 16' is disposed between the first and the second arc parts 116', 116.

The receiving end comprises a curved engaging channel B composed of a bottom base 14', an outer guide wall 12, and an inner guide wall 12'. The outer guide wall 12 has a flat wall surface 122 at the front part thereof and a zigzag wall surface 121 at the rear part thereof. The first and the second guide blocks 14, 15 are disposed at the front and the rear ends of the inner wall 12' respectively to assist the lock end 11 engaging with the receiving end 12 through the distances A and A'. The inner guide wall 12' extends rearward to adjoin the other end of the second arc part 116. Another circular recess 16 is disposed at an intersection of the inner guide wall 12' and the second arc part 116.

When the lock end part 112 on the lock end 11 is inserted to enter the engaging channel B, the zigzag part 111 can be meshed with the zigzag wall surface 121 on the outer wall 12. Furthermore, the guide blocks 14, 15 can prevent the engaged lock end 11 from releasing. Once the bundle of electric wires on the decorative light assembly is tied up in the hollow space of the engaged bind ring, the inner annular surface 17 is smooth and will not scratch outer skins of the wires. In addition, the bind ring can be adjusted the tightness to match the firmness required.

The aforesaid embodiment of the bind ring is applied to tie up the electric wires of a decorative light assembly in Christmas holidays. It can be appreciated that the bind ring of the present invention can be applied to tie up the electric wires, telephone wires, electric wires, and optical fiber cables respectively either before arranging them all in a gathering groove.

While the present invention has been described with reference to a preferred embodiment thereof, it is to be understood that modifications and variations may be easily made without departing from the spirit of this invention, which is defined by the appended claim.

What is claimed is:

1. A bind ring comprising a ring shaped body with a zigzag lock end and a zigzag receiving end, having an inner annular surface, and said ring shaped body further comprising an inclining arc part, extending out of the zigzag lock end;

a first arc part, joining the inclining arc part;

a second arc part, joining the first arc part, and the zigzag receiving end, respectively; and two circular recesses, being located at an intersection of the second arc part and the zigzag receiving end and an intersection of the second arc part and the first arc part, respectively; wherein the zigzag lock end further comprising a lock end part and a zigzag part near the lock end part; and the zigzag receiving end further comprising a curved engaging channel composed of a bottom base, an outer guide wall, and an inner guide wall, the outer guide wall having a flat surface and a zigzag surface joining to each other, a first and a second guide blocks being disposed at a front and both ends of a inner wall, respectively to assist the lock end engaging with the receiving end (12), and the inner guide wall joining the second arc part;

whereby, the zigzag lock end is adjustably engaging with the zigzag receiving end by way of the zigzag surface on the outer guide wall and the zigzag part on the lock end to tie up a bundle of electric wires or cables.

2. A bind ring as defined in claim 1, wherein the annular surface is smooth without scratching outer skins of electric wires or cables.

* * * * *